United States Patent [19]

Tronzano

[11] Patent Number: 4,685,010

[45] Date of Patent: Aug. 4, 1987

[54] LOCKING AND EJECTING DEVICE FOR A RECORDING AND REPRODUCING APPARATUS FOR MAGNETIC DISCS

[75] Inventor: Sergio Tronzano, Caluso, Italy

[73] Assignee: Ing. C. Olivetti & C., S.p.A., Ivrea, Italy

[21] Appl. No.: 719,882

[22] Filed: Apr. 4, 1985

[30] Foreign Application Priority Data

Apr. 5, 1984 [IT] Italy ................. 67332 A/84

[51] Int. Cl.⁴ ..................... G11B 17/02; G11B 17/04
[52] U.S. Cl. ........................................ 360/97; 360/99
[58] Field of Search ..................................... 360/97–99

[56] References Cited

U.S. PATENT DOCUMENTS

| 4,539,613 | 9/1985 | Suyama et al. | 360/99 |
| 4,562,498 | 12/1985 | Shibata | 360/97 |
| 4,570,195 | 2/1986 | Shimaoka et al. | 360/97 |
| 4,573,093 | 2/1986 | Obama et al. | 360/97 |

*Primary Examiner*—Robert S. Tupper
*Attorney, Agent, or Firm*—Banner, Birch, McKie & Beckett

[57] ABSTRACT

A recording and reproducing apparatus for magnetic discs, each one contained in a protective case (23), comprises a frame (11) having a front slot (20) for the insertion of a case (23). The disc case (23) slides into a support unit (30) spaced above a driving hub (81) and a magnetic head (90) mounted on a carriage (91). The support unit (30) is urged downwardly by springs (37) but is held in the raised position by pins (32, 33) trapped in slots (54) of tongues (50 to 53) upstanding from a slider (45). The disc case engages a lever (70) which turns clockwise and engages a lever (61) to turn this also clockwise. The lever (61) disengages from an edge of the slider (45) which moves forwardly under the action of a spring (48) to free the pins (32, 33) and allow the support unit (30) to drop down vertically, guided by the pins (32, 33) in vertical slots (34, 35). The lever (70) may additionally push a cover of the disc case laterally to uncover slots (24) in the disc case. To remove the disc case (23) the slider (45) is pushed back by a button (49) and the tongues (50 to 53) cam the pins (32, 33) upwardly again, while springs biasing the lever (61 and 70) reset these levers and eject the disc case (23) out from the apparatus.

6 Claims, 7 Drawing Figures

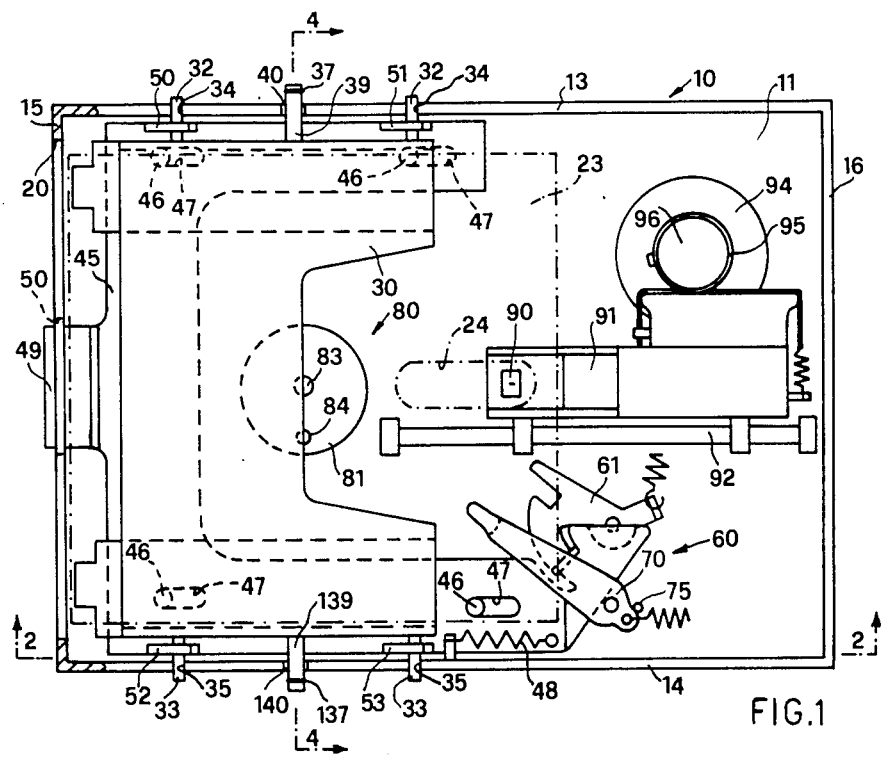
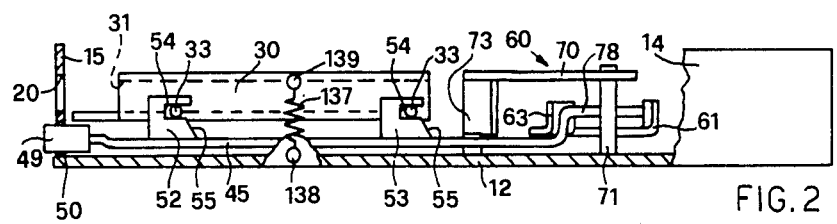
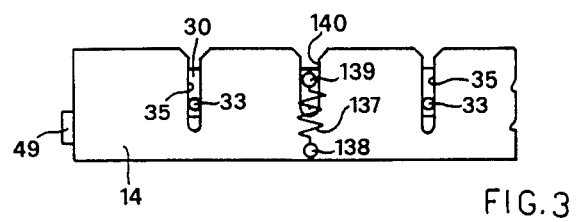

LOCKING AND EJECTING DEVICE FOR A RECORDING AND REPRODUCING APPARATUS FOR MAGNETIC DISCS

BACKGROUND OF THE INVENTION

1. Field of the Invention

The present invention relates to an apparatus for writing on and/or reading from magnetic discs contained in a protective case.

The apparatus comprises a drive member which is engageable with a disc to rotate it within its case, a magnetic read and/or write head and a support unit for the disc-carrying case movable between a first position for disc insertion and removal and a second position in which the disc is in a nominal operating plane, in engagement with the drive member and cooperating with the magnetic head.

2. Description of the Prior Art

An Apparatus is known, in which the support unit for the case of the disc is pivotally mounted at one end and can swing between a rest position which permits the disc to be inserted into the apparatus and an operating position in which the disc is disposed in the nominal operating plane in engagement with the drive member and the magnetic head. In that apparatus, an external flap member which can be actuated by the operator after the disc has been inserted into the support unit causes the support unit to hinge between the rest position and the operating position.

SUMMARY OF THE INVENTION

The object of the present invention is to automate the movement of the support unit between the rest position and the operating position. The apparatus according to the invention is characterised in that the support unit is spaced from and parallel to the nominal operating plane in the first position and by a mechanism which is actuable by the disc case upon introduction thereof into the support unit for moving the support unit from the first to the second position.

These and other features of the invention will be more clearly apparent from the following description of a preferred embodiment which is given by way of example, with reference to the accompanying drawings.

BRIEF DESCRIPTION OF THE DRAWINGS

FIG. 1 is a partly sectional plan view of an apparatus embodying the invention,

FIG. 2 is a view in section taken along line 2—2 in FIG. 1,

FIG. 3 is a side view of part of the apparatus of FIG. 1,

DESCRIPTION OF A PREFERRED EMBODIMENT

Figure 4:
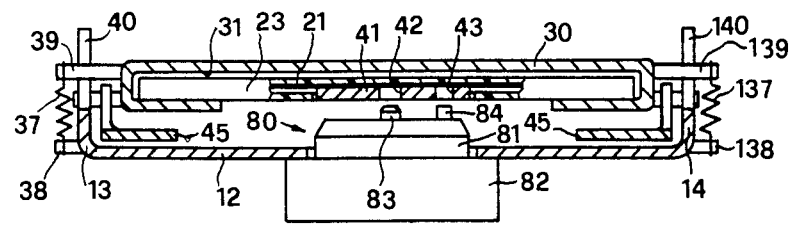
FIG. 4 is a view in section taken along line 4—4 in FIG. 1.

Referring to FIG. 1, an apparatus 10 for recording and/or reproducing from magnetic discs comprises a frame 11 formed by a base plate 12, two side portions 13 and 14, a forward front wall 15 and a rearward wall 16.

Provided in the front wall 15 is a slot 20 through which the magnetic discs to be processed can be introduced into the apparatus 10.

Figure 5:
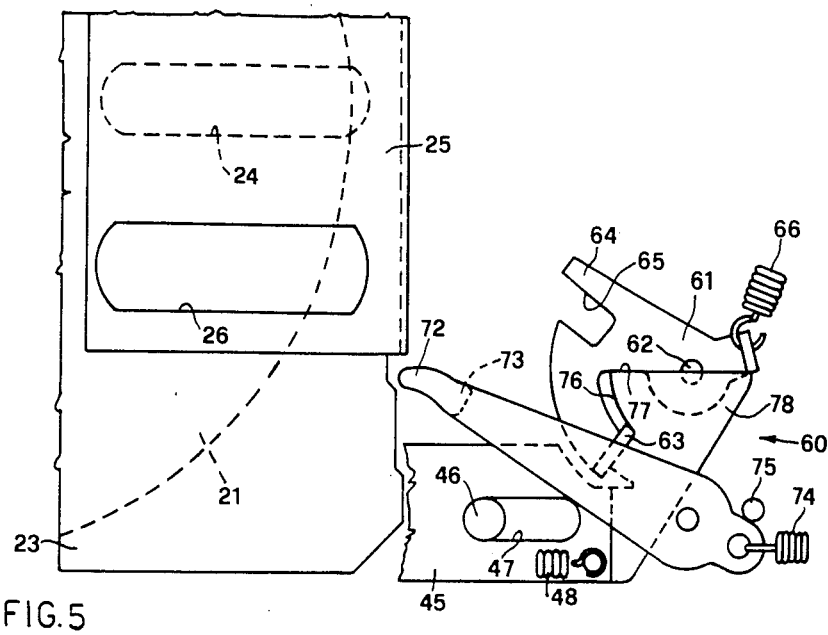
FIG. 5 is a detail on an enlarged scale of the apparatus in FIG. 1, in the rest position.
Figure 6:
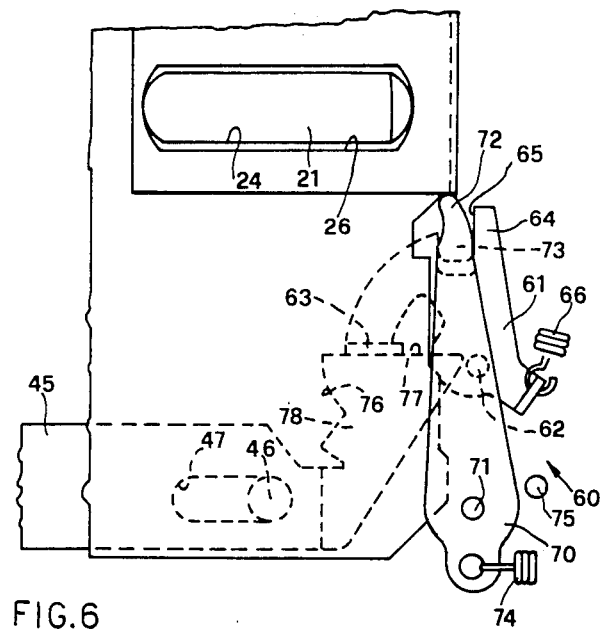
FIG. 6 is the detail shown in FIG. 5, in the operating position.

In particular, the apparatus 10 is capable of processing, one at a time, magnetic discs 21 of the flexible type, which are each contained in a protective jacket or case 23 which is made for example of plastics material (FIGS. 4, 5 and 6). Each case 23 comprises a pair of slots 24 which are in oppositely disposed relationship, extending radially with respect to the disc 21 and through which the writing and/or reading members can have access to the actual disc 21. Only one of the slots 24 is shown in the drawings.

More properly, the apparatus 10 is also capable of processing magnetic discs contained in cases which are provided with a closure element 25 which is slidable with respect to the case and which has a pair of slots 26 associated with the slots 24. The closure element 25 is constantly pulled by a spring (not shown) towards a rest position, in which the element covers the slots 24 in the case 23 (see FIG. 5). The disc 21 which is contained in this type of case is also provided with a central metal hub 41 which has a central hole 42 and a hole 43 which is eccentric with respect to the central hole 24, by means of which holes the disc can co-operate with a corresponding drive member of the apparatus 10, which will be described in greater detail hereinafter.

The apparatus 10 comprises a support unit 30 (see FIGS. 1, 2 and 4) which is formed by a plate bent in such a way to define an internal cavity 31, being of substantially rectangular cross-section, into which a case 23 can be inserted.

The support unit 30 is provided at its sides with two pairs of pins or pegs 32 and 33 which are guided by two pairs of slots 34 and 35 respectively provided in the side portions 13 and 14 of the base 11.

The support unit 30 is constantly drawn towards the base plate 12 of base 11 by a pair of springs 37 and 137 which are engaged between two pegs or pins 38 and 138 fixed to the base (FIG. 3) and two pins or pegs 39 and 139 which are fixed to the frame 30 and which are housed with clearance in slots 40 and 140 provided in the side portions 13 and 14.

A slider or plate 45 is disposed between the baseplate 12 and the support unit 30 and is slidable parallel to the baseplate 12 (see FIGS. 1, 2 and 4), guided by four fixed pegs or pins 46 which are housed in four slots 47 in the plate 45.

The plate 45 is constantly drawn towards the front wall 15 of the base 11 by a spring 48 and is provided with a button 49 housed in an opening 50 in the wall 15, which is lower than the slot 20.

The plate 45 is provided with four lateral uprights 50, 51, 52 and 53 which co-operate with the pegs or pins 32 and 33 on the support unit 30. In particular, each upright 50, 51, 52 and 53 is provided with a recess 54 and with an inclined surface portion 55.

A mechanism 60 is capable of controlling the movement of the plate 45 parallel to the baseplate 12 and the resulting movement of the support unit 30 in a direction perpendicular to the baseplate 12.

The mechanism 60 (see FIGS. 1, 2, 4 and 5) comprises a first lever 61 which is pivotally mounted on a pin 62 on the base 11 and which is so shaped as to provide an upper limb 63, a lateral limb 64 and a recess 65. A spring 66 urges the lever 61 in an anticlockwise direction.

The mechanism 60 further comprises a second lever 70 which is pivotally mounted on a fixed pin 71 on the base 11, and is provided at one of its ends at 72 with a lower projection 73 which in turn is co-operable with the lateral limb 64 and the recess 65 of the lever 61. A spring 74 urges the lever 70 is an anticlockwise direction. A fixed abutment 75 is provided to limit the rotary movement of the lever 70.

The upper limb 63 of the lever 61 co-operates with an end 78 of the plate 45 and more particularly with a curved edge 76 and a straight edge 77 of the plate 45.

The apparatus 10 further comprises a drive member 80 comprising a spindle 81 which is mounted rotatably on the base 11 and connected to an electric motor 82. The spindle 81 is provided with a central peg 83 capable of connecting to the central hole 42 in the hub 41 of the disc 21, and an eccentric peg 84 which can connect to the hole 43 in the hub 41.

A magnetic head 90 is mounted on a carriage 91 which is slidable along a line which is radial with respect to the disc 21, being guided by a cylindrical guide 92 fixed to the base 11. The axial sliding movement of the carriage 91 is controlled by a second electric motor 94 which is fixed to the base 11, by means of a flexible belt 95 of known type, which has its ends connected to the carriage 91 and a central portion wrapped round the hub 96 of the motor 94.

The mounting of the magnetic head 90 on the carriage 91, which is effected separately before installation thereof in the apparatus, is one of the features of the invention and will now be described.

Figure 7:
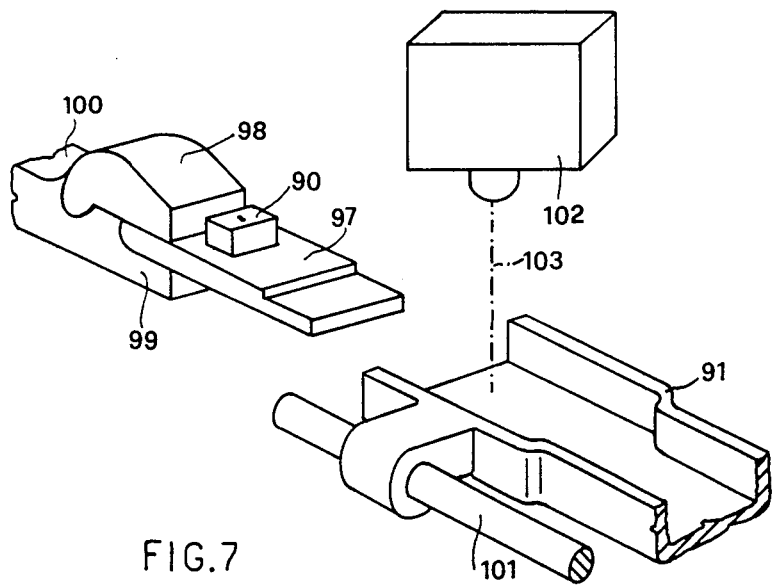
FIG. 7 is a detail of an assembly for mounting the carriagemagnetic head unit of the apparatus in FIG. 1.

Referring the FIG. 7, the magnetic head 90 is, as a preliminary step, fixed to a support plate 97 which is then gripped between two jaws 98 and 99 of a vice 100 which can be oriented and displaced in any direction, in any known fashion.

The carriage 91 is then mounted on a cylindrical guide 101 of an assembly which includes an optical instrument 102. The guide 101 simulates the position of the guide 92 in the apparatus 10.

The plate 97 is then positioned by the vice 100 on the carriage 91, with the magnetic head 90 in alignment with the axis 103 of the optical instrument 102. The vice 100 is adjusted until it is detected on the optical instrument that the head 90 is correctly positioned with respect to a nominal reference position, and the plate 97 is glued on the carriage 91 in the position in which it has been set. Finally, the carriage-head assembly which has been thus formed in that way is removed from the reference guide 101 and mounted in the apparatus 10.

The magnetic head 90 is accordingly perfectly oriented with respect to the nominal reference position. This method of preassembly of the carriage-head unit is particularly speedy, reliable and economical.

The mode of operation of the apparatus 10 as described hereinbefore is as follows:

In the rest position as shown in FIGS. 1, 2, 3, 4 and 5, the apparatus 10 is disposed with the support unit 30 raised with respect to and parallel to a nominal operating plate passing through the spindle 81 and the magnetic head 90. The support unit 30 is held in that rest position by the uprights 50, 51, 52 and 53 of the plate 45 against the force of the springs 37 and 137. In fact, the pins or pegs 32 and 33 on the support unit 30 are housed in the recesses 54 in the uprights.

In turn, the plate 45 is displaced towards the rearward wall 16 of the base 11 against the force of the spring 48 and is held in that position by the mechanism 60 and in particular by the upper limb 63 of the lever 61, which co-operates with the edge 76 at the end 78.

In that rest position, the support unit 30 is aligned with the slot 20, being ready to receive in its cavity 31 a case 23 containing a disc 21. When a case 23 is inserted into the apparatus 10, the closure element 25 covers the slots 24 which permit the magnetic head 90 to have access to disc 21. It will be the mechanism 60 that controls the movement of the element 25 until the slots 26 thereof are in line with the slots 24.

In particular, when the case 23 is inserted into the cavity 31 in the support unit 30, by way of the slot 20, after a predetermined travel, the case comes into contact with the portion 73 of the lever 70. By pushing the case 23 further inwardly of the apparatus 10, the lever 70 is caused to rotate in the clockwise direction (see FIG. 5), against the force of the spring 74.

That rotary movement causes displacement of the closure element 25 with respect to the case 23. The lever 70, after a rotary movement through about 30°, brings its lower projection 73 into engagement with the arm of the lever 61.

By continuing to insert the case 23 inwardly of the apparatus 10, the lever 61 is also rotated in a clockwise direction against the force of the spring 66.

When the case 23 is completely fitted into the cavity 31 in the support unit (being the position shown in FIG. 6 and in broken lines in FIG. 1), the closure element 25 is disposed with its slots 26 in line with the slots 24 in the case 23 and the latter is disposed with the hub 41 over the spindle 81 and the slots 24 in line with the magnetic head 90.

The plate 45 which is no longer retained by the limb 63 of the lever 61 moves towards the front wall 15, being pulled by the spring 48. Consequently, the support unit 30 which is no longer retained in the raised position by the uprights 50, 51, 52 and 53 moves towards the nominal operating plane by being displaced parallel to itself, guided by the slots 34 and 35 and being pulled by the springs 37 and 137.

The support unit 30, in moving downwardly, brings the hub 42 into engagement with the drive spindle 81 and the disc 21 into contact with the magnetic head 90.

Reading and/or writing of the disc 21 contained in the case 23 is effected in known manner, by rotating the disc 21 by means of the motor 82 and displacing the magnetic head 90 by means of the motor 94.

In order to remove the case 23 from the apparatus 10, it is only necessary to press the button 49 towards the front wall 15. In that way, the plate 45 is slid towards the rear wall 16 and the uprights 50, 51, 52 and 53 are moved into the rest position. By means of the inclined surface portions 55 on the uprights, which cooperate with the pegs or pins 32 and 33, the uprights lift the support unit 30 and move it back into the rest position.

When the plate 45 has finished its travel movement, that is to say, when the support unit 30 has already been raised, the edge 77 of the end 78 no longer co-operates with the limb 63 of the lever 61 and the spring 66 thus returns the lever 61 to the rest position. At the same time also the lever 70 which is no longer trapped in the recess 65 in the lever 61 moves back into the rest position, being pulled by the spring 74, thus releasing the closure element 25 which also moves into the rest position, automatically expelling the case 23 from the apparatus 10 by way of the slot 20.

It will be clear therefore that the support unit 30 is movable between a first position in which it is spaced from and parallel to the nominal operating plane to permit the case 23 to be introduced, and a second position in which the disc 21 contained in the case 23 is disposed substantially in the nominal operating plane and is engaged with the drive member 81 and the magnetic head 90, and that a mechanism 60 which is actuable by the actual case 23 when it is introduced into the support unit is provided for displacing the support unit 30 from the first to the second position.

What I claim is:

1. A recording and reproducing apparatus for a magnetic disc which is contained in a protective case, comprising a drive member which is engageable with said magnetic disc to rotate it within its protective case; a magnetic head; a suppport unit for supporting the disc case, means for guiding the support unit between a first position wherein a disc case can be inserted into and removed from the support unit, and a second position in which the disc is engageable with the drive member and cooperative with the magnetic head; and an actuating slider which is slidable between an insertion position and an operative position along a given direction and having means defining the first and the second position of the support unit corresponding with said insertion position and said operative position, respectively; and a locking and ejecting mechanism for said actuating slider and said disc case, said locking and ejecting mechanism comprising:

a first arrest surface and a second arrest surface of said actuating slider disposed transverse to said given direction and along said given direction, respectively;

an intermediate lever urged by a first spring toward a first position and comprising a first locking element and a second locking element, wherein said first locking element is engageable with the second arrest surface of said actuating slider in the operative position of said actuating slider to arrest said intermediate lever in a second position against the action of said first spring;

a second spring for urging said actuating slider toward its operative position, wherein the first locking element of said intermediate lever is engageable with the first arrest surface of said actuating slider to arrest it in said insertion position against the action of said second spring, and wherein said first locking element releases said first arrest surface in the second position of said intermediate lever; and a release lever held at rest in the trajectory of said disc case, wherein said release lever comprises a cooperation element cooperative with said intermediate lever to move it beyond its second position upon insertion of said disc case in the support unit, whereby causing releasing of the actuating slider toward its operative position, locking of said intermediate lever in its second position, and positioning of the support unit in its second position;

wherein the second locking element of said intermediate lever is engageable with said release lever to arrest it in a locked position when the intermediate lever is arrested in its second position, whereby arresting the release lever in said locked position; and wherein said second arrest surface is configured to disengage said first locking element for releasing the intermediate lever from said second position in response to sliding of said actuating slider to its insertion position, whereby causing the intermediate lever to arrest against said actuating slider in said insertion position against the action of said second spring and said release lever to eject said disc case from the support unit jointly with the return of the support unit to its first position.

2. A recording and reproducing apparatus for a magnetic disc which is contained in a protective case, comprising a support unit movable between a first position wherein a disc case can be inserted into and removed from the support unit, and a second position in which the disc is engageable with a drive member and a magnetic head of the apparatus; an actuating slider which is slidable from an insertion position to an operating position under the action of an actuating spring along a given direction having arrest means and means defining the first and the second position of the support unit, respectively; an intermediate lever movable between a first and a second position, urged by an intermediate spring toward the first position and comprising a locking portion engageable with the arrest means of said actuating slider to arrest it in said insertion position against the action of said actuating spring and releasing said arrest means in said second position; a release lever held at rest in the trajectory of the disc case under the action of a release spring and operative on said intermediate lever for dragging the intermediate lever in the second position upon the insertion of the disc case in the support unit; and the combination comprising:

an arrest surface of said actuating slider disposed along said given direction, wherein the locking portion of said intermediate lever is engageable with said arrest surface to arrest said intermediate lever in said second position against the action of said intermediate spring; and a locking element of said intermediate lever engageable with said release lever to arrest it in a locked position when the intermediate lever is arrested in its second position; and wherein said arrest surface is configured to disengage said locking portion to release the release lever from its second position in response to sliding of said actuating slider to said insertion position, for causing said release lever to eject said disc case from the support unit jointly with the movement of the support unit to its first position.

3. A recording and reproducing apparatus according to claim 2, wherein said arrest means comprises a first edge of said actuating slider of arcuate shape.

4. A recording and reproducing apparatus according to claim 3, wherein said arrest surface comprises a second edge of the actuating slider adjacent to said first edge.

5. A recording and reproducing apparatus according to claim 4, wherein said release lever operates on said intermediate lever through a projecting member cooperative with an arm of said intermediate lever and wherein the locking element of said intermediate lever comprises a notch adjacent to said arm and cooperative with said projecting member.

6. An apparatus according to claim 1 or 2, for use with a disc case which comprises a first pair of slots which are radial with respect to the disc contained therein, and a closure element for closing said first pair of slots and provided with a second pair of slots which are capable of being aligned with said first pair of slots of said case to permit said magnetic head to contact said disc, wherein said release element co-operates with said closure lever to move said second pair of slots into line with said first pair of slots in said case during the operation of inserting said case into said support unit.

* * * * *